United States Patent
Hu et al.

(10) Patent No.: US 12,307,053 B2
(45) Date of Patent: May 20, 2025

(54) DETECTING INPUT GESTURES USING ONBOARD MICROPHONES

(71) Applicant: GOOGLE LLC, Mountain View, CA (US)

(72) Inventors: Jingying Hu, Menlo Park, CA (US); Juston Payne, Woodside, CA (US); Dongeek Shin, Santa Clara, CA (US); Shiblee Hasan, Santa Clara, CA (US); Xiuxiu Yuan, Atlanta, GA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/453,697

(22) Filed: Nov. 5, 2021

(65) Prior Publication Data

US 2023/0144825 A1  May 11, 2023

(51) Int. Cl.
*G06F 3/043* (2006.01)
*G06F 3/041* (2006.01)
*G06N 20/00* (2019.01)
*G10L 25/51* (2013.01)

(52) U.S. Cl.
CPC ............ *G06F 3/043* (2013.01); *G06F 3/0418* (2013.01); *G06N 20/00* (2019.01); *G10L 25/51* (2013.01)

(58) Field of Classification Search
CPC ...... G06F 3/043; G06F 3/0433; G06F 3/0436; G06F 3/0418; G06N 20/00; G10L 25/51
See application file for complete search history.

(56) References Cited

U.S. PATENT DOCUMENTS

| | | | |
|---|---|---|---|
| 10,289,205 B1 | 5/2019 | Sumter et al. | |
| 10,788,897 B1 | 9/2020 | Benko et al. | |
| 10,877,558 B1 | 12/2020 | Zhao | |
| 10,928,889 B1 | 2/2021 | Whitmire et al. | |
| 11,416,075 B1* | 8/2022 | Gong | G01S 5/18 |
| 2013/0027572 A1* | 1/2013 | Petrou | G02B 27/017 348/220.1 |
| 2015/0131814 A1* | 5/2015 | Usher | G06F 3/017 381/123 |
| 2015/0199025 A1 | 7/2015 | Holz | |
| 2016/0085298 A1* | 3/2016 | Kristensson | G06F 3/015 345/173 |
| 2016/0091308 A1 | 3/2016 | Oliaei | |
| 2017/0090865 A1 | 3/2017 | Armstrong-Muntner et al. | |
| 2018/0164874 A1 | 6/2018 | Qiu et al. | |
| 2018/0286402 A1 | 10/2018 | Lebeau et al. | |
| 2019/0364371 A1* | 11/2019 | Han | H04R 25/405 |

OTHER PUBLICATIONS

International Search Report and Written Opinion for PCT Application No. PCT/US2022/079330, mailed on Feb. 15, 2023, 15 pages.

* cited by examiner

*Primary Examiner* — Adam R. Giesy
(74) *Attorney, Agent, or Firm* — Brake Hughes Bellermann LLP

(57) ABSTRACT

A method including generating two or more audio signals (e.g., by two or more microphones) based on a user interaction with a wearable device, generating an audio signature based on the two or more audio signals, and identifying at least one of a coordinate or a gesture based on an output of a machine-learned model given the audio signature.

20 Claims, 9 Drawing Sheets

DETECTING INPUT GESTURES USING ONBOARD MICROPHONES

FIELD

Implementations relate to gesture detection in wearable computing devices such as frame-based augmented reality (AR) devices (e.g., glasses, smart glasses, AR headset, and/or the like).

BACKGROUND

Wearable devices typically require user inputs. A common solution is to add touch pads to the device, e.g., on the frame of glasses. A user can then interact (e.g., a finger swipe) with the touch pad to provide a user input to the wearable device.

SUMMARY

A wearable device can include two or more microphones used to generate an audible signal based on a user interaction (e.g., touch) of the wearable device. The audible signal can be used to predict or generate a user input.

In a general aspect, a device (e.g., a wearable device, AR device, and/or the like), a system, a non-transitory computer-readable medium (having stored thereon computer executable program code which can be executed on a computer system), and/or a method can perform a process with a method including generating two or more audio signals (e.g., by two or more microphones) based on a user interaction with the wearable device, generating an audio signature based on the two or more audio signals, and identifying at least one of a coordinate or a gesture based on an output of a machine-learned model given the audio signature.

Implementations can include one or more of the following features. For example, the generating of the audio signature can include measuring characteristics associated with the two or more audio signals, generating features associated with the measured characteristics, and generating the audio signature based on the features. The characteristics can include at least one of energy, power, time start, time stop, spectrogram measurements, or band limited sampling, and the features can include at least one of power peaks, time between power peaks, power spans, or min power spans. The machine learned model can be at least one of a regressor trained to predict coordinates associated with the wearable device based on user interactions or a classifier trained to predict a spatial gesture based on the user interactions. The device can include a texture configured to indicate a characteristic associated with the user interaction.

The parameters used by the machine-learned model can be modified by a user of the wearable device using a user interface operating on a computing device communicatively coupled to the wearable device and modifying the parameters can modify the identified at least one coordinate or gesture. The two or more audio signals can be based on internal vibrations over the device. The device includes a phase offset layer and the microphones are embedded internally in the frame, wherein the coordinate is based on phase delays caused by the phase offset layer. The instructions can further cause the processor to generate a feature matrix based on the audio signature using beamforming. The device can be configured to at least one of, prevent false interaction detection, or ensure the two or more audio signals is based on contact with the wearable device. The device is a frame-based augmented reality (AR) device.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein.

Figure 1A:
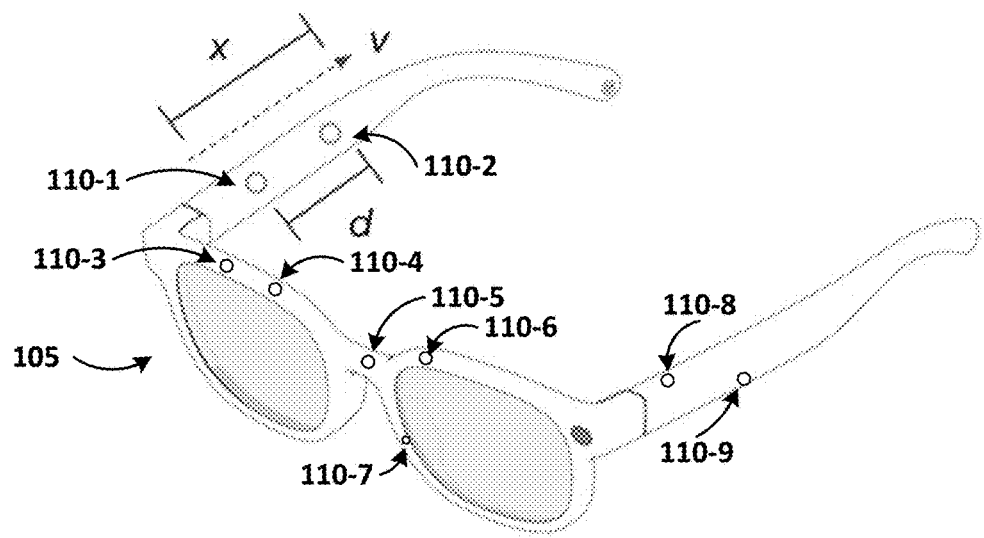
FIG. 1A illustrates a frame-based augmented reality (AR) device according to at least one example implementation.

It should be noted that these Figures are intended to illustrate the general characteristics of methods, structure, and/or materials utilized in certain example implementations and to supplement the written description provided below. These drawings are not, however, to scale and may not precisely reflect the precise structural or performance characteristics of any given implementation and should not be interpreted as defining or limiting the range of values or properties encompassed by example implementations. For example, the relative thicknesses and positioning of detectors (e.g., microphones), layers, regions and/or structural elements may be reduced or exaggerated for clarity. The use of similar or identical reference numbers in the various drawings is intended to indicate the presence of a similar or identical element or feature.

DETAILED DESCRIPTION

A user input for wearable devices can include adding physical sensors (e.g., touchpads) to the body of the wearable device. For example, physical sensors can be added to the frame of an AR device or to the band of a smart watch or ring. These physical sensors can add an undesirable size and weight to the device or otherwise adversely affect the colors, material, finish, and/or design of the product. In addition, the physical sensors may cause the appearance of the wearable device to be unattractive and/or cosmetically appear like a consumer electronics product or interfere with the desired functionality of the device within the intended form-factor. Accordingly, while touching the device, e.g., frames, is an intuitive action for users, adding physical sensors to the wearable device can have problematic product drawbacks. Example implementations describe techniques that can preserve the benefits of touch as a user input interaction without the addition of bulky and/or unattractive physical sensors to detecting the user input interaction.

An example implementation can use two or more microphones that are internal to the body of the wearable device, e.g., the frames of an AR device (e.g., in an arm of the frame), the band of a smart ring, watch, or fitness tracker, etc., to detect sound waves from fingers touching the body of the wearable device. A machine learned model can be trained to interpret these sound waves to register user inputs. For example, a finger traveling along a surface of the frame of AR glasses could be registered as, for example, a scroll gesture. Accordingly, some example implementations can use existing hardware associated with the frame-based AR device with, for example, a software implementation. Therefore, the wearable device, e.g., the frame-based AR device, can be in the form of an AR device, e.g., AR glasses, that are attractive and/or cosmetically pleasing. Some example implementations can add microphones to the body of the wearable device to implement disclosed techniques. While the figures illustrate an example implementation in the context of a frame-based AR device for ease of explanation, implementations are not limited to AR glasses, as the disclosed techniques can be applied in a similar manner in other computer-based (or "smart") wearables, such as rings, watches, fitness trackers, shoes, hats, etc. with two or more microphones included in the body of the wearable.

FIG. 1A illustrates a frame-based augmented reality (AR) device according to at least one example implementation. As shown in FIG. 1A, a frame-based AR device 105 (e.g., AR glasses) includes two or more microphones 110-1, 110-2 separated by a distance d. A finger swipe in the direction of the dotted line or arrow can have a velocity v and a distance x (where x can be greater than d, x can be less than d, or x can be equal to d).

While FIG. 1A illustrates two microphones on the arm of the frame-based AR device 105, implementations may include three, four, or more microphones. For example, the frame-based AR device 105 can include microphones 110-3, 110-4 in the frame above (or below, to the side, etc.) the lens, microphone 110-5 in the bridge of the frame-based AR device 105, 110-6, 110-7 in the frame around the lens on different planes, and/or 110-8, 110-9 in the arm of the frame on different frames (e.g., top/bottom, inside/outside, and/or the like, and/or any combination). In addition, the microphone 110-1, 110-2, 110-3, 110-4, 110-5 can be microphone-like (e.g., other than voice sound) elements. For example, a piezoelectric device/crystal and/or other device that detects vibrations/sound waves. The microphone positioning can be generalizable such that the microphone pointing directions achieve a detection design goal. For example, a best signal may be using a microphone that is facing towards the user finger. However, other orthogonal positions there can be a detectable signal.

Example implementations can exploit a multi-microphone response on the body, e.g., on an arm of, the frame-based AR device 105. The response can be based on a user interaction (e.g., touch, swipe, and/or the like) with the frame of the AR device 105. In one implementation, the response can be used to determine, predict, estimate, and/or the like, for example, finger cartesian coordinates. The predicted coordinates can be used as input to an application engine (e.g., software) that determines an interaction routine (e.g., left/right swipe to decrease/increase media volume) for the user. In an example implementation, the frame-based AR device 105 can have a wide x-baseline (e.g., a wide arm) that can support multi-microphone structures for spatial tracking.

The physical parameters d, v and x can be expressed in a framework of continuous tracking on the frame-based AR device 105 as d: the distance between the two microphones in a given pair (e.g., in cm); v: the velocity of a finger moving in a particular direction (e.g., in cm/s); and x: the distance that the finger in contact with the frame-based AR device 105 covers during gesture (e.g., in cm). The physical parameter d can be in a fixed position (e.g., not moveable by a user) determined by the specific frame-based AR device 105 hardware. The physical parameters v and x can be interaction parameters and may vary among users.

In an example implementation, micromovement tracking (e.g., where x is small) and a high dynamic range of touch velocity (e.g., capable of detecting low and high v) can be desirable. For example, the physical parameter d can be approximately ¼ of the length of the arm, e.g., 2.85 cm on the 12 cm arm of the frame-based AR device 105. Therefore, the finger gestures displacement or the physical parameter x may have a similar scale, for example a few centimeters, as well. Accordingly, example implementations can detect and identify small audio signatures from the multiple microphones. The audio signatures can be pooled to determine spatial properties of the coordinates of the user's touch on the frame-based AR device 105.

Figure 1B:
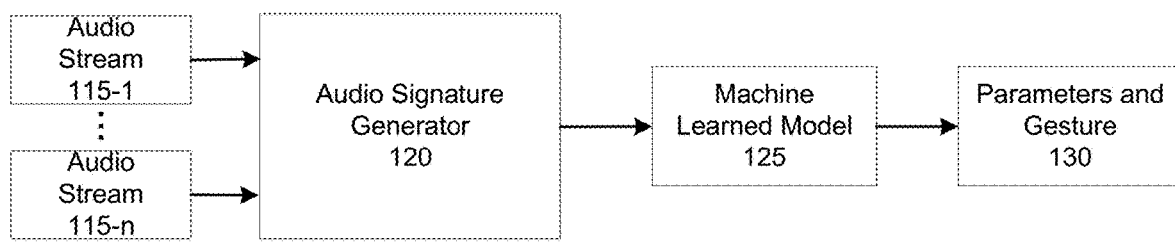
FIG. 1B illustrates a block diagram of an information flow associated with user input on the frame-based AR device according to at least one example implementation.

FIG. 1B illustrates a block diagram of an information flow associated with user input on the frame-based AR device according to at least one example implementation. As shown in FIG. 1B the information flow includes audio stream 115-1, ..., 115-$n$ blocks, an audio signature generator 120 block, a machine learned model 125 block, and a parameters and gesture 130 block. The audio stream 115-1, ..., 115-$n$ blocks can represent the audio output of the two or more microphones 110-1, 110-2. Therefore, in an example implementation corresponding to the frame-based AR device 105, the audio stream 115-1, ..., 115-$n$ blocks can be referred to as audio stream 115-1, audio stream 115-2, audio stream 115-3, etc.

The audio signature generator 120 can be configured to measure characteristics of the plurality of audio streams 115-1, ..., 115-$n$. The characteristics of the audio stream can include signal strength or power, time start, time stop, spectrogram measures, band-limited sampling, and/or the like. The audio signature generator 120 can be configured to generate features, attributes, traits, and/or the like (herein after features) based on the measured characteristics. For example, features can include the measured characteristics, power peaks, time between power peaks, power spans, min power spans, and/or the like. The audio signature generator 120 can be configured to generate an audio signature based on the features. For example, features (e.g., associated with all of, or a subset of, the plurality of audio streams 115-1, . . ., 115-$n$) can be grouped together. The audio signature may also be represented as a vector, with each feature representing one dimension of the vector. Each dimension of the vector (e.g., each feature in the audio signature) may be represented as an integer or a floating-point number.

The machine learned model 125 can be either a regressor or classifier depending on whether the output of the model 125, parameters and/or gesture 130, is a prediction of one (or two) degrees-of-freedom (DoF) tracking (e.g., x, y coordinates) or a prediction of a spatial gesture. In some implementations, the machine learned model 125 can include a number of classifiers trained to provide a prediction for a number of gestures given an audio signature generated from audio streams 115-1, 115-2, etc. for the frame-based AR device 105. In some implementations, the machine learned model 125 can include a regressor that can be configured to output parameters based on the audio signature. For example, the parameters can be a coordinate system on the arm of frame-based AR device 105. In such an implementation the machine learned model 125 may output a set of coordinates representing the starting point and ending point of a gesture, from which a particular user input gesture can be determined. In some implementations, the machine learned model 125 may use a combination of a regressor and one or more classifiers. For example, the classifiers may use the output of the regressor as input.

In some implementations, the user may be able to customize the machine learned model 125 by providing parameters used in the output layer to personalize the interpretation of the audio signatures. The user personalized interpretation of the audio signatures can be implemented through use of a user interface (e.g., operating on a mobile device communicatively coupled with the frame-based AR device 105) that a user can use to modify (e.g., personalize) the output of the machine learned model 125, e.g., parameters and/or gesture 130. In an example implementation, the user interface can enable the user to select regions of the frame-based AR device 105 for a particular gesture (e.g., tapping, swiping, pinching, and/or the like). The x y coordinates of the region may be used by the machine learned model 125 in predicting the particular gesture. In an example implementation, the user interface can enable the user to map interactions to respective operations.

Figure 2A:
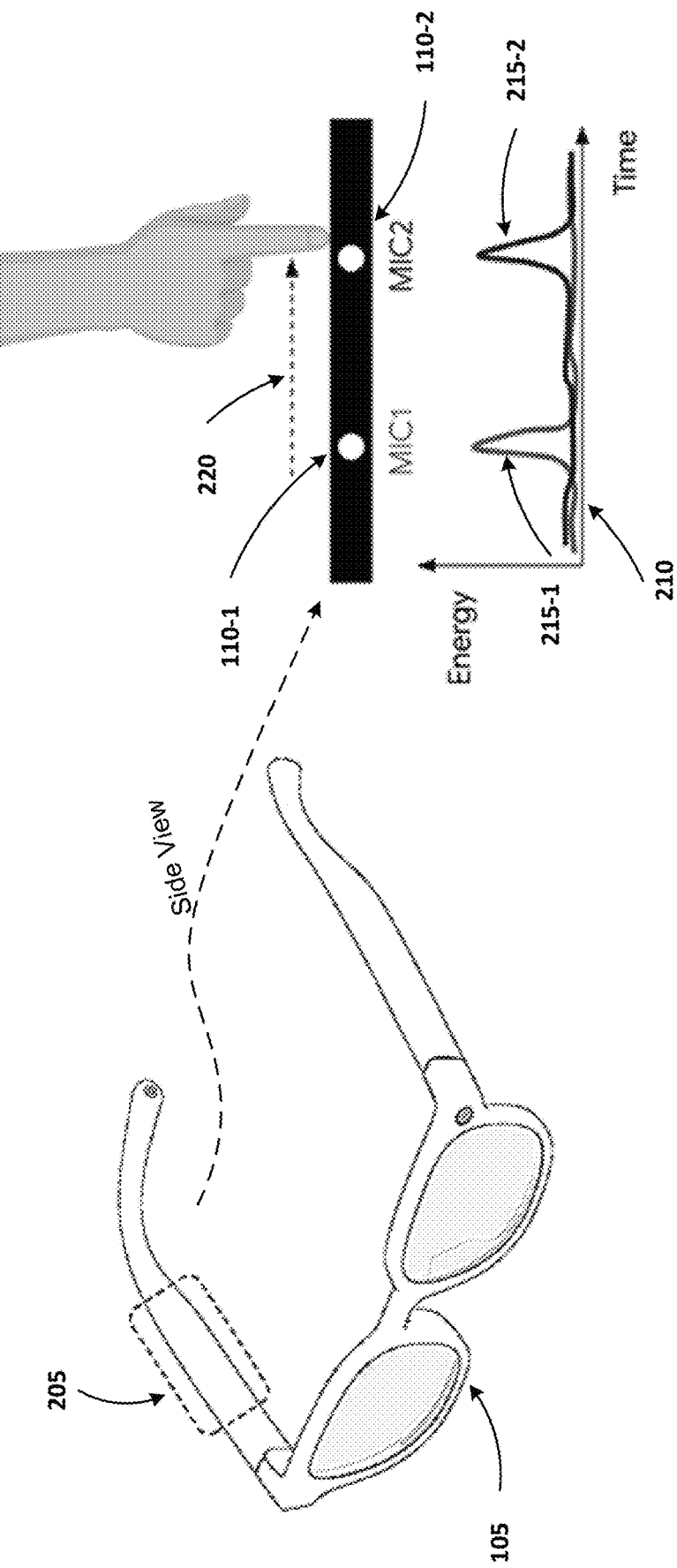
FIG. 2A illustrates an example signal response associated with a user input on the frame-based AR device according to at least one example implementation.

FIG. 2A illustrates a signal response associated with a user input on the frame-based AR device according to at least one example implementation. As shown in FIG. 2A, the arm of the frame-based AR device 105 has a region 205. A finger can be swiped across the region 205 in the direction 220. In response to the finger swipe, each of the two or more microphones 110-1, 110-2 can generate an audio signal. Graph 210 illustrates the audio signal as a trace 215-1 representing the signal generated by microphone 110-1 and a trace 215-2 representing the signal generated by microphone 110-2 as energy over time.

Trace 215-1 shows an energy peak or impulse associated with microphone 110-1 and trace 215-2 shows an energy peak or impulse associated with microphone 110-2. The microphones can obtain point measurements associated with the finger swipe along the arm of the frame-based AR device 105 (e.g., in region 205). As the user swipes the finger over the arm of the frame-based AR device 105, an implementation can generate one impulse-like peak (e.g., as shown by trace 215-1 and 215-2) for each microphone 110-1 and 110-2 at various timestamps. The time-delay parameter that separates the two peaks can be used to determine the velocity v of the one DoF interaction the user is performing on the arm of the frame-based AR device 105.

In an example implementation, a surface of the frame-based AR device 105 can have a texture (e.g., dimples, groves, protrusions and/or the like) to add information for determining a characteristic, for example, a direction, a distance, a quantity, and/or the like. For example, a surface the arm of the frame-based AR device 105 (e.g., in region 205) can have protrusions (e.g., as small lines or bumps on the surface) that, as the finger slides over the protrusions, changes the sound causing impulse-like signals to be generated by the microphones 110-1, 110-2. A pattern of the impulses can be used to generate a characteristic in the audio signature indicating the direction, the distance, the quantity, and/or the like. The sound can be caused to be changed based on a structure and/or pattern of the texture. For example, a dimple can be rounded on one side and flattened on another.

Figure 2B:
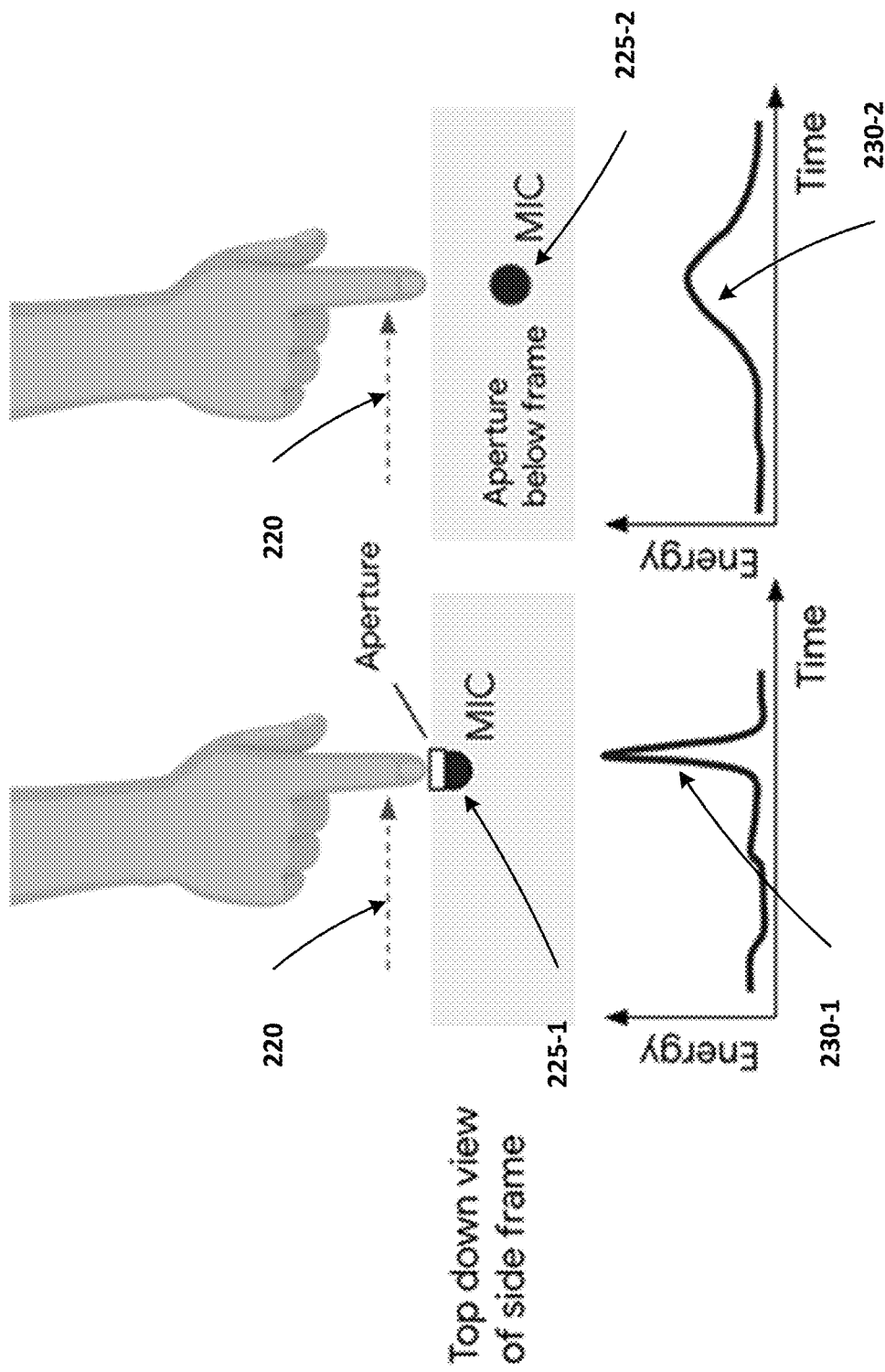
FIG. 2B illustrates example signal responses associated with a user input on the frame-based AR device according to example implementations.

FIG. 2B illustrates example signal responses associated with a user input on the frame-based AR device according to example implementations. As shown in FIG. 2B, microphones 225-1 and 225-2 are located at different depths in the arm with microphone 225-1 being close to the surface and microphone 225-2 being further away (e.g., deeper) from the surface. The location (e.g., relative to the surface) or aperture of a microphone can impact the shape of an audio signal trace (e.g., trace 230-1, 230-2). The energy peak or impulse-like signal (e.g., trace 230-1) can be generated when the microphone aperture is closer (e.g., microphone 225-1) to the user interaction (e.g., the finger swipe contact point). By contrast, a more diffuse signal (e.g., trace 230-2) can be generated when the aperture is further away from the interaction. In other words, a microphone closer to (or on) the surface that the finger is passing over can generate an impulse-like signal that has a higher energy value as compared to a microphone that is under the surface or on the opposite side surface. The audio signal detection can be described as indirect structure-borne propagation rather than direct touch input.

Example implementations can differentiate between two peaks (e.g., the peaks associated with trace 215-1 and trace 215-2) in order to accurately determine or estimate a time delay value based on d and v (see FIG. 1A). Accordingly, the inter-microphone peak energy time delay can be calculated as $T(delay)=d/v$.

For example, the faster the interaction gesture, the shorter the time delay. In a first scenario, the peaks of the impulse recordings on all microphones (e.g., microphones 225-1 and 225-2) can be completely resolvable (e.g., sufficiently separated in time). Accordingly, the time delay can be determined using a peak detector(s) for substantially all interaction velocities v. The first scenario may also include the use of a codec rate or signal sampling rate that is suitably fast.

In a second scenario, the peaks of the impulse recordings on all microphones (e.g., microphones 225-1 and 225-2) may be too close in time to be completely resolved. Peaks that are close in time can be referred to as peak collapse. For example, the swipe of a finger can be at a sufficiently high velocity v that the signal generated by the microphones (e.g., microphones 225-1 and 225-2) may not be processed (e.g., a codec rate or sampling time is not fast enough) to completely resolve the peaks. The minimally resolvable detail, minimum separation between peaks, or minimum angular separation, sometimes called a Rayleigh criterion can be used to measure peak collapse.

Figure 2C:
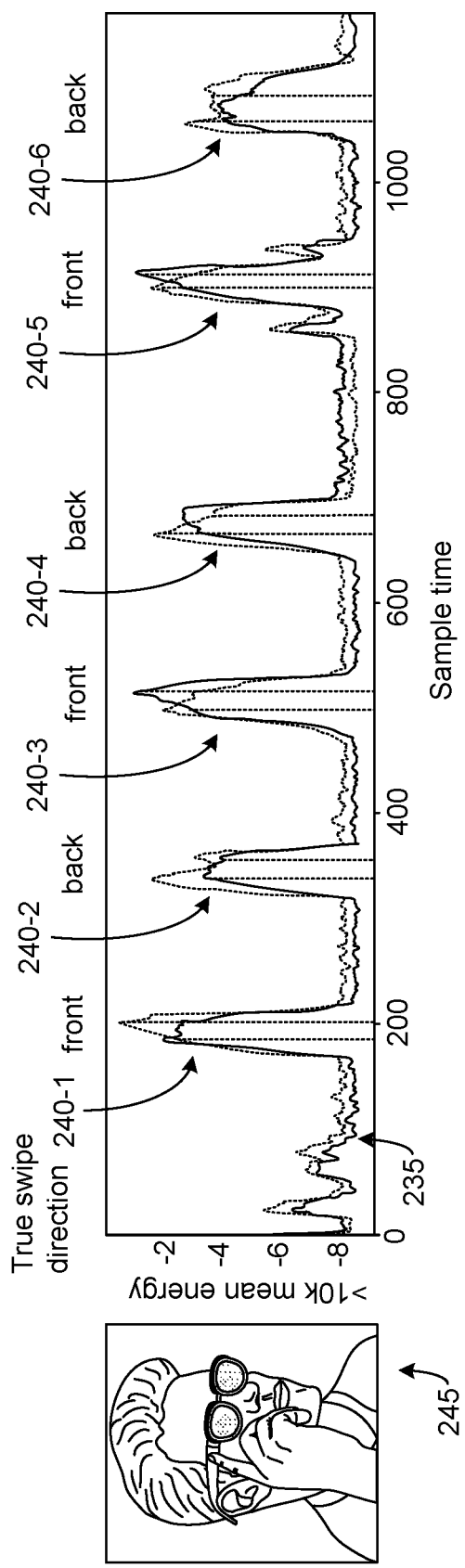
FIG. 2C illustrates a signal response associated with a user input on the frame-based AR device according to at least one example implementation.

FIG. 2C illustrates a signal response associated with a user input on the frame-based AR device according to at least one example implementation. The signal response(s) illustrate resolvable signals or signal peaks associated with a back-and-forth swipe. A signal response 235 illustrated in FIG. 2C can illustrate an example of signals approaching peak collapse. For example, a user 245 can swipe (e.g., back-and-forth) the user's finger across the arm of a frame-based AR device (e.g., frame-based AR device 105). As shown in FIG. 2C, each impulse-like signal have peaks 240-1, 240-2, 240-3, 240-4, 240-5, 240-6 associated with each microphone signal that are close together in time. In other words, the two impulse-like signals collide without having two separate visible peaks.

As shown in FIG. 2C, the impulse-like signal peaks 240-1, 240-2, 240-3, 240-4, 240-5, 240-6 are associated with back-and-forth swipes. These energy features slightly rush/ lag depending on the gesture. This means that the dual energy feature from the two microphones for a natural swipe has enough resolvability to tell the difference between the user swiping front vs. back.

When the assumptions that support the first and second scenarios described above do not exist, a third scenario can exist where x<d<<v. In the third scenario the physical evidence of a touch is less and thus an algorithm that can beamform the location of the touch can be used. For example, when x<<<d, the touch displacement can be short and easy to perform. As such, no peaks may be generated if the interaction (e.g., swipe) is performed in the middle of the region 205 where the microphones (e.g., microphones 225-1 and 225-2) are baseline-separated. In this scenario, the useful signal can be in the diffuse, omnidirectional structure-borne propagation responses.

Figure 3A:
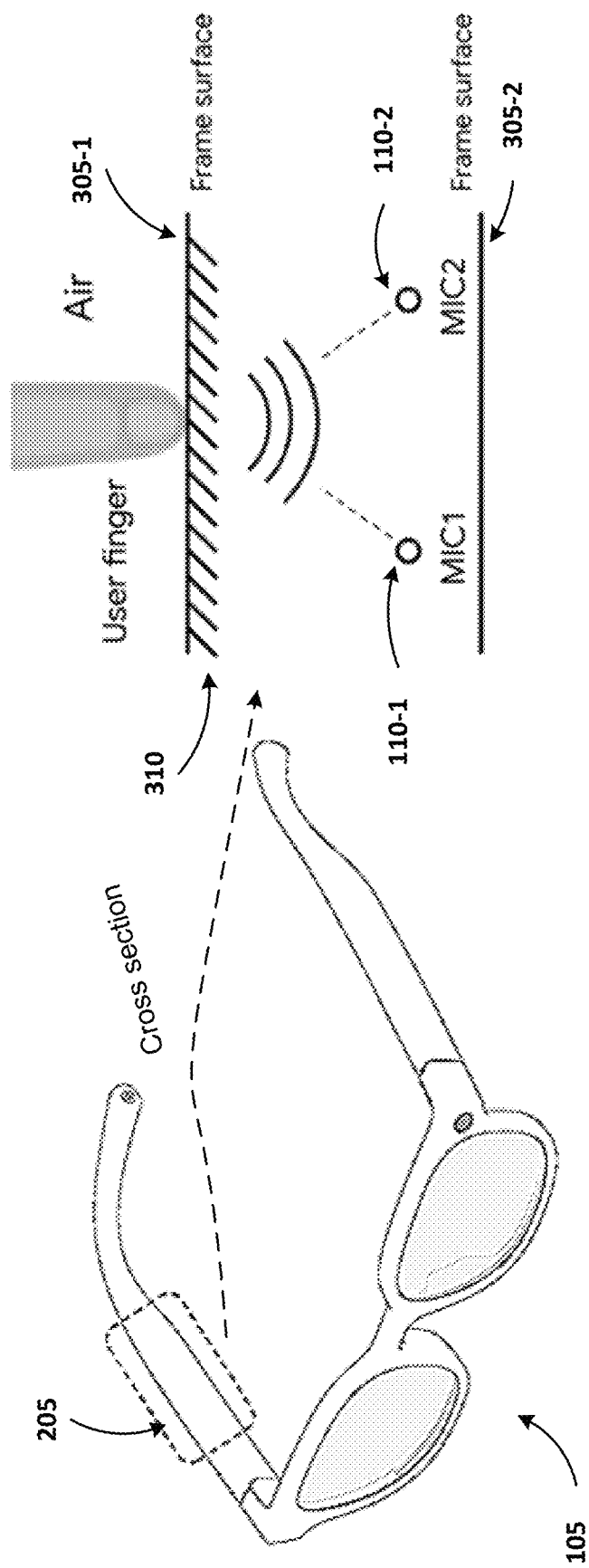
FIG. 3A illustrates an example signal detection associated with a user input on the frame-based AR device according to at least one example implementation.

FIG. 3A illustrates a signal detection associated with a user input on the frame-based AR device according to at least one example implementation. As shown in the example of FIG. 3A, microphones 110-1, 110-2 can be embedded internally with apertures between the surface 305-1, 305-2 (e.g., sub-surface) of the frame-based AR device 105. Therefore, the interacting finger may not be in contact with the microphones 110-1, 110-2. However, the microphones 110-1, 110-2 can receive internal vibrations over the frame-based AR device 105 material. Extracting coordinate information in this example implementation may not be based on amplitude deltas. Instead, phase delays from offsets can be used to extract coordinate information (e.g., using the machine learned model 125). These phase delays can be generated using a phase offset layer 310 and modifying the information flow illustrated in FIG. 1B.

The phase offset layer 310 can be configured to generate a phase difference between the audio signal detected by each of microphone 110-1 and microphone 110-2. For example, during a swipe, the finger can be centered between microphone 110-1 and microphone 110-2 such that the peak signal should arrive at microphone 110-1 and microphone 110-2 at the same moment in time. However, the phase offset layer 310 can insert a directional delay such that there is a time difference between the peak signal arriving at microphone 110-1 and microphone 110-2. This delay can help distinguish between the two audio signals. In an example implementation the phase offset layer 310 is a minimal thickness as compared to the width of the region 205.

Figure 3B:
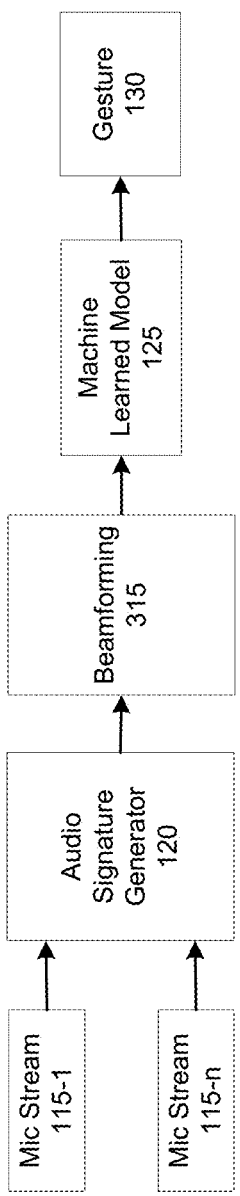
FIG. 3B illustrates a block diagram of an information flow associated with user input on the frame-based AR device according to at least one example implementation.

FIG. 3B illustrates a block diagram of an information flow associated with user input on the frame-based AR device according to at least one example implementation. FIG. 3B is an example modification of the information flow illustrated in FIG. 1B. As shown in FIG. 3B the signal flow includes the plurality of audio streams 115-1, . . . , 115-n, the audio signature generator 120 block, the machine learned model 125 block, the parameters and/or gesture 130 block, and a beamforming 315 block.

The beamforming 315 can be configured to generate a feature matrix based on the generated audio signature. The feature matrix can include time delay information and signal energy information. An example beamforming 315 can include a weighted delay-and-sum (WDAS) that sweeps over the one (or two) DoF direction to create a feature matrix with axes of angle and frequency. An example implementation can be based on:

$$\hat{x} = \sum_{i=1}^{M} w_i * x_i = \sum_{i=1}^{M} \left(a_i * e^{-j\pi\theta_i}\right) * x_i$$

where:
- $x_i$ is the sound waveform recorded on microphone index n,
- $w_i$ is the weight that is tuned based on the eye-tracking result, and
- $\hat{x}$ is the beamformed audio result In order to beamform the incoming audio response, using the WDAS principle can be to emphasize sounds coming from the direction of interest and reject ones that are not. The weights can be complex-valued because subtle phase shifts can be used to represent the distance differences from source to various microphones on the wearable device. The right combination of delays can be used to amplify the signal coming from a particular direction.

In an example implementation, the frame-based AR device 105 can be configured to prevent false interaction detection and/or to ensure audio signals are based on contact (e.g., finger contact) with the frame-based AR device 105. For example, audio signals (e.g., generated by a speaker) can neutralize background noise. For example, a material (e.g., a wire), a mechanical cavity, an acoustic cavity, and or the like, can be included in the frame-based AR device 105 that can provide an audio transmission channel that decreases the attenuation of the sound or amplifies the sound generated by the interaction (e.g., swipe). Preventing false interaction detection and/or ensuring contact can be accomplished by improving a signal to noise ratio of the audio associated with user interactions.

Figure 4:
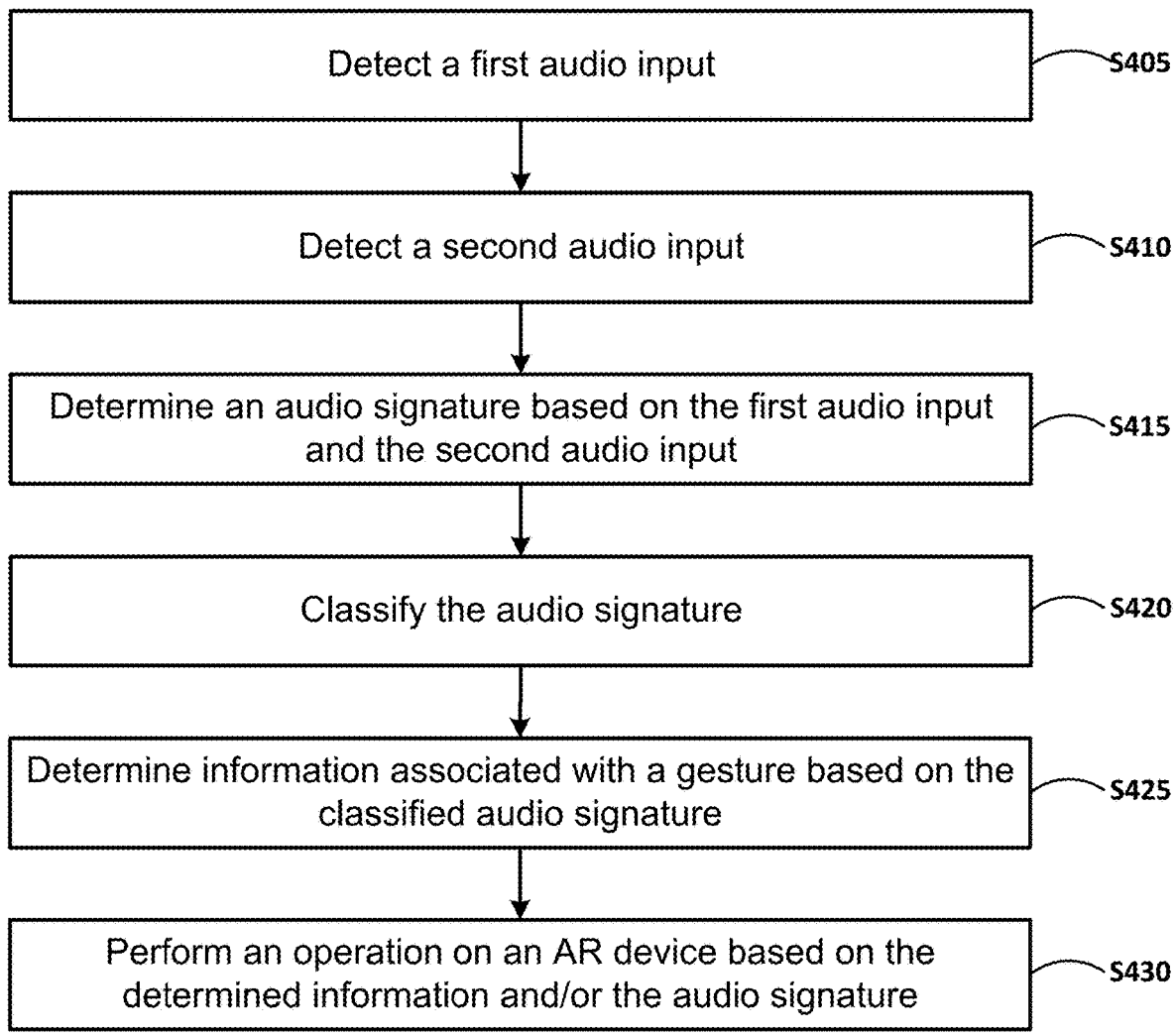
FIG. 4 illustrates a block diagram of a method of user input on a frame-based AR device according to at least one example implementation.

FIG. 4 illustrates a block diagram of a method of user input on a frame-based AR device according to at least one example implementation. As shown in FIG. 4, in step S405 a first audio input is detected. For example, a microphone (e.g., microphone 110-1, 110-2) can generate an audio signal. The audio signal can be generated in response to a user (e.g., user finger) interaction (e.g., swipe) on a surface of an AR device (e.g., the arm or rim of frame-based AR device 105). The audio signal can be detected (e.g., sampled) as the first audio input.

In step S410 a second (or at least one second) audio input is detected. For example, a microphone (e.g., microphone 110-1, 110-2) can generate an audio signal. The audio signal can be generated in response to a user (e.g., user finger) interaction (e.g., swipe) on a surface of an AR device (e.g., the arm or rim of frame-based AR device 105). The audio signal can be detected (e.g., sampled) as the second audio input. In an example implementation, the first audio input and the second audio input are continuous input signals. In other words, the microphone (e.g., microphone 110-1, 110-2) can continuously generate an audio signal. In an example implementation, the first audio input and the second audio input are associated with different microphones. For example, the first audio input can be associated with microphone 110-1 and the second audio input can be associated with microphone 110-2. In an example implementation, there are two or more second audio inputs responsive to two or more second microphones (e.g., n microphones where n≥2). While FIG. 4 illustratively discusses two audio signals and two microphones, implementations may include three, four, or more microphones each configured to generate an audio signal.

In step S415 an audio signature is determined based on the first audio input and the second audio input. For example, characteristics of the first audio input and the second audio input can be measured. The characteristics can include signal strength or power, time start, time stop, spectrogram measures, band-limited sampling, and/or the like. The audio signature can be based on features, attributes, traits, and/or the like (herein after features) based on the measured characteristics. For example, features can include the measured characteristics, power peaks, time between power peaks, power spans, min power spans, and/or the like. The audio signature can be generated based on the features. For example, features can be pooled or grouped together as an audio signature. In an example implementation, a plurality of small (e.g., short in time) audio signatures from two or more microphones can be pooled (e.g., grouped, combined or merged) together in order to determine spatial properties (e.g., coordinates) associated with a user's interaction (e.g., touch, swipe, and the like) on a surface of an AR device (e.g., the frame-based AR device 105). The audio signature may also be represented as a vector, with each feature representing one dimension of the vector. Each dimension of the vector (e.g., each feature in the audio signature) may be represented as an integer or a floating-point number.

In step S420 at least one of a coordinate or a gesture is identified based on an output of a machine-learned model given the audio signature. For example, the machine-learned model can be either a regressor or classifier depending on whether the output of the machine-learned model, parameters and/or gesture 130, is a prediction of one (or two) degrees-of-freedom (DoF) tracking (e.g., x, y coordinates) or a prediction of a spatial gesture. In some implementations, the machine-learned model can include a number of classifiers trained to provide a prediction for on a number of gestures given an audio signature for a wearable device (e.g., the frame-based AR device 105). In some implementations, the machine-learned model can include a regressor that can be configured to output parameters based on the audio signature. For example, the parameters can be a coordinate system on the wearable device (e.g., the arm of frame-based AR device 105). In such an implementation the machine-learned model may output a set of coordinates representing the starting point and ending point of a gesture, from which a particular user input gesture can be determined. In some implementations, the machine-learned model may use a combination of a regressor and one or more classifiers. For example, the classifiers may use the output of the regressor as input.

In step S425 an operation is performed on an AR device based on the determined gesture information and/or characteristic of the audio signature. For example, a swipe can be based on the signature information, a direction of the swipe can indicate a volume increase or decrease, and the swipe distance can indicate an amount of volume increase or decrease (should an audio application be executing). In another example, the swipe direction can indicate a scroll in a menu, or a displayed document, a displayed webpage, and/or the like. In another example, the swipe direction can indicate turning a feature on or off. Other operation, gesture and/or audio signature pairings are within the scope of this disclosure. In some implementations, the machine-learned model can be configured to determine an operation that is to be performed based on the identified coordinate and/or gesture.

Figure 5:
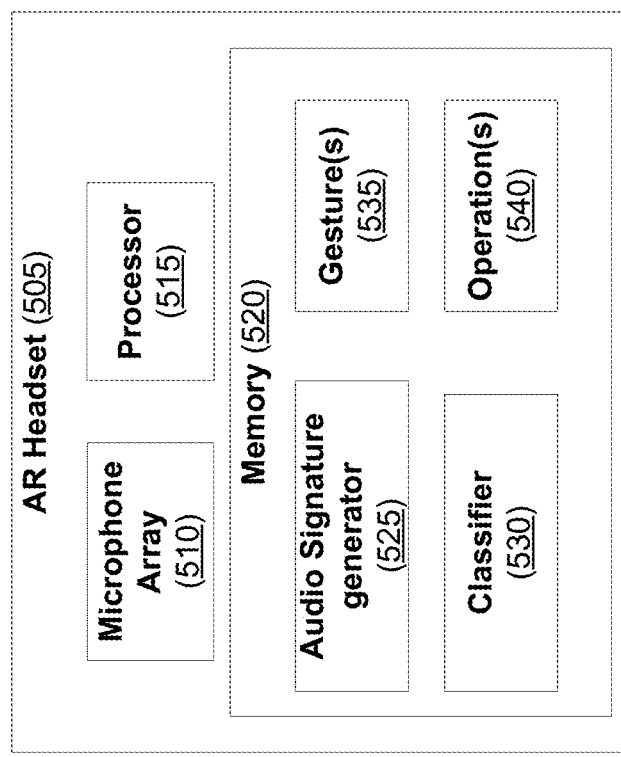
FIG. 5 illustrates a block diagram of a device for user input on a frame-based AR device according to at least one example implementation.

FIG. 5 illustrates a block diagram of a device for user input on a wearable device according to at least one example implementation. As shown in FIG. 5, a wearable device 505 includes a microphone array 510, a processor 515, and a memory 520. The memory 520 includes an audio signature generator 525, a classifier 530, gestures 535, and operations 540. The wearable device 505 can be a frame-based augmented reality (AR) device (e.g., glasses, smart glasses, AR headset, and/or the like).

The microphone array 510 can include a plurality of microphones at least a subset of the microphones being embedded in the wearable device 505. The wearable device 505 can be a frame-based AR device. Therefore, the plurality of microphones (e.g., microphones 110-1, 110-2) can be embedded in, for example, an arm of the frame-based AR device (e.g., a frame-based AR device 105).

In the example of FIG. 5, the wearable device 505 can include a computing system or at least one computing device and should be understood to represent virtually any wearable computing device configured to perform the techniques described herein. As such, the wearable device 505 may be understood to include various components which may be utilized to implement the techniques described herein, or different or future versions thereof. By way of example, wearable device 505 is illustrated as including processor 515 (e.g., at least one processor), as well as at least one memory 520 (e.g., a non-transitory computer readable storage medium).

The processor 515 may be utilized to execute instructions stored on the at least one memory 520. Therefore, the processor 515 can implement the various features and functions described herein, or additional or alternative features and functions. The processor 515 and the at least one memory 520 may be utilized for various other purposes. For example, the at least one memory 520 may represent an example of various types of memory and related hardware and software which may be used to implement any one of the modules described herein.

The at least one memory 520 may be configured to store data and/or information associated with the wearable device 505. The at least one memory 520 may be a shared resource. Therefore, the at least one memory 520 may be configured to store data and/or information associated with other elements (e.g., image/video processing or wired/wireless communication) within the larger system. Together, the processor 515 and the at least one memory 520 may be utilized to implement the audio signature generator 525, the classifier 530, the gestures 535, and the operations 540.

The audio signature generator 525 can be configured to generate an audio signature based on audio signals received from the microphone array 510. For example, characteristics (e.g., power, time start, time stop spectrogram measures, band-limited sampling, and/or the like) of the audio signals can be measured. The audio signature can be based on features, attributes, traits, and/or the like (herein after features) based on the measured characteristics. For example, features can include power peaks, time between power peaks, power spans, min power spans, and/or the like. The audio signature can be generated based on the features. For example, features can be pooled or grouped together as an audio signature. In an example implementation, a plurality of small (e.g., short in time) audio signatures from two or more microphones can be pooled (e.g., combined or merged) together in order to determine spatial properties (e.g., coordinates) associated with a user's interaction (e.g., touch, swipe, and the like) on a surface of the wearable device 505.

The classifier 530 can be configured to classify the audio signature. For example, the signature can indicate a type or class of input. The input can be a gesture, the input can be dimensional (e.g., have cartesian coordinates), the input can be device-like (e.g., mouse, keyboard, and/or the like). Other input classifications are within the scope of this disclosure. Classifying the audio signature can help determine whether or not the following steps are performed. For example, if the audio signature is a gesture, determining what the gesture is may be performed. Otherwise, if the input is device-like or dimensional, no gesture information may be needed.

The classifier 530 can be implemented as a machine learned algorithm or model. For example, the classifier can be implemented as a trained neural network (e.g., a convolutional neural network (CNN) or two-dimensional CNN). The trained neural network can be a classification network (e.g., like VGG/ResNet) with convolution blocks followed by a maxpool down-sampling applied to encode the audio signature into feature representations. The feature representations or feature maps. The most probable feature can be a predicted classifier.

The gestures 535 can be configured to determine information associated with a gesture based on the classified audio signature. For example, information indicating what type of gesture was made can be determined. An application operating on the wearable device 505 may help determine the information associated with the gesture. For example, a swipe when an audio application is playing may indicate a volume increase or decrease, a change in playback selection, and/or the like.

The operations 540 can be configured to determine an operation to be performed on the wearable device 505 based on the determined information and/or the audio signature. For example, a swipe can be based on the gesture information, the swipe direction can indicate a volume increase or decrease, and the swipe distance can indicate an amount of volume increase or decrease (should an audio application be executing). Another example can be a swipe can be based on the gesture information, the swipe direction can indicate a scroll in a menu, or a displayed document, a displayed webpage, and/or the like. Another example can be a swipe based on the gesture information, the swipe direction can indicate turning a feature on or off. Other operation, gesture and/or audio signature pairings are within the scope of this disclosure.

Figure 6:
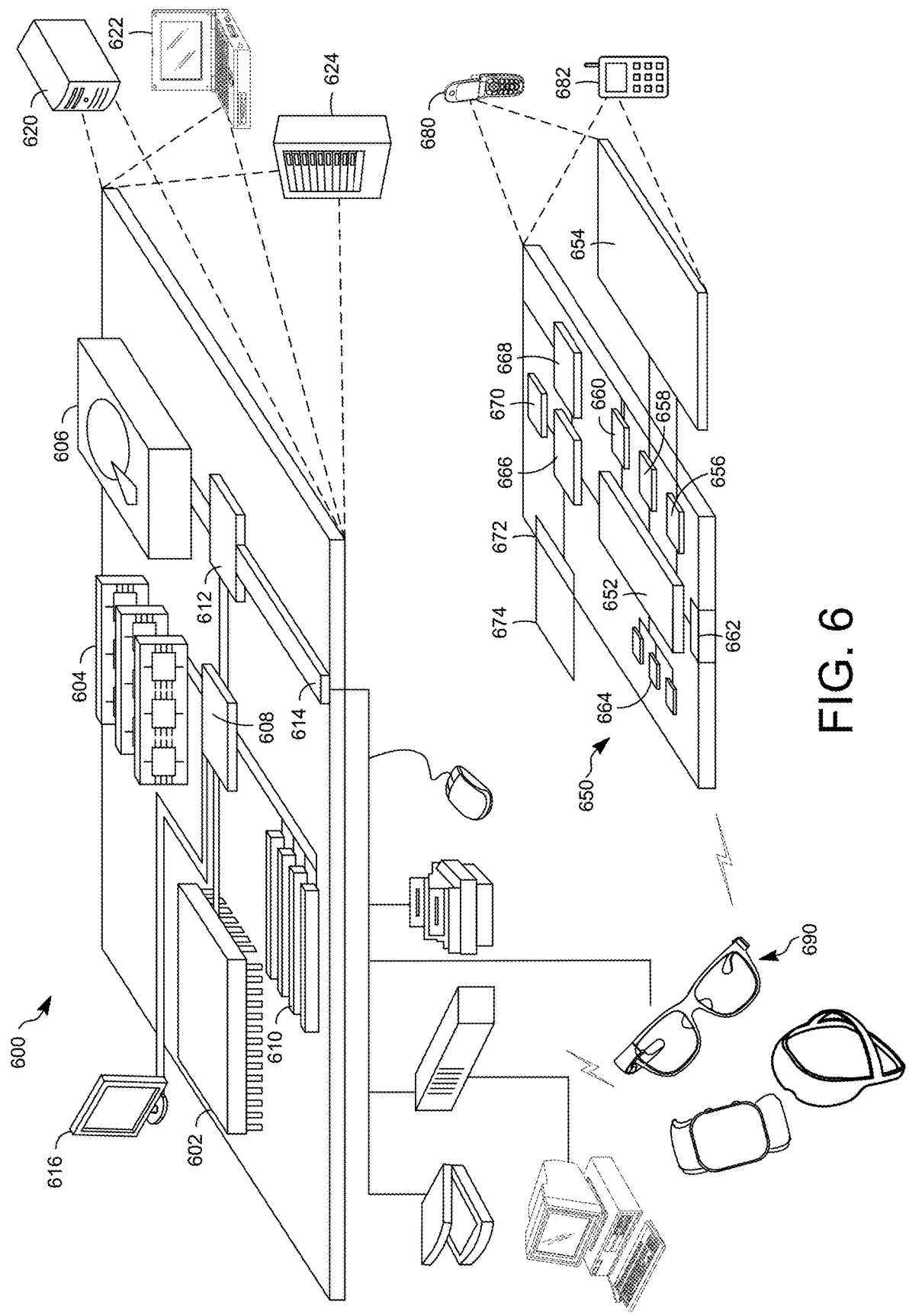
FIG. 6 shows an example of a computer device and a mobile computer device according to at least one example implementation.

FIG. 6 illustrates an example of a computer device 600 and a mobile computer device 650, which may be used with the techniques described herein. The computing device 600 includes a processor 602, memory 604, a storage device 606, a high-speed interface 608 connecting to memory 604 and high-speed expansion ports 610, and a low-speed interface 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of functions is for example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display), and LED (Light Emitting Diode) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In-Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device for displaying information to the user. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 690 to generate an augmented environment for viewing inserted content within the physical space. For example, one or more sensors included on a computing device 650 or other computing device depicted in the figure, can provide input to the AR headset 690 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 650 can use the sensors to determine an absolute position and/or a detected rotation of the computing device in the AR space that can then be used as input to the AR space. For example, the computing device 650 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 650 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 650 when the computing device is incorporated into the AR space can cause a particular action to occur in the AR space.

In some implementations, a touchscreen of the computing device 650 can be rendered as a touchpad in AR space. A user can interact with the touchscreen of the computing device 650. The interactions are rendered, in AR headset 690 for example, as movements on the rendered touchpad in the AR space. The rendered movements can control virtual objects in the AR space.

In some implementations, one or more output devices included on the computing device 650 can provide output and/or feedback to a user of the AR headset 690 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 650 may appear as another object in a computer-generated, 3D environment. Interactions by the user with the computing device 650 (e.g., rotating, shaking, touching a touchscreen, swiping a finger across a touch screen) can be interpreted as interactions with the object in the AR space. In the example of the laser pointer in an AR space, the computing device 650 appears as a virtual laser pointer in the computer-generated, 3D environment. As the user manipulates the computing device 650, the user in the AR space sees movement of the laser pointer. The user receives feedback from interactions with the computing device 650 in the AR environment on the computing device 650 or on the AR headset 690. The user's interactions with the computing device may be translated to interactions with a user interface generated in the AR environment for a controllable device.

In some implementations, a computing device 650 may include a touchscreen. For example, a user can interact with the touchscreen to interact with a user interface for a controllable device. For example, the touchscreen may include user interface elements such as sliders that can control properties of the controllable device.

Computing device 600 is intended to represent various forms of digital computers and devices, including, but not limited to laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A wearable device comprising:
a housing including a first microphone and a second microphone, the first microphone being configured to process a first audio signal based on a swipe across the wearable device, the second microphone being configured to process a second audio signal based on the swipe across the wearable device, the swipe extending from the first microphone to the second microphone, the first microphone and the second microphone being separated by a distance d, the housing including an acoustic cavity configured to amplify the first audio signal and amplify the second audio signal;
a processor; and
a memory storing instructions that, when executed by the processor, cause the wearable device to:
determine a velocity of the swipe based on a time delay between the first audio signal and the second audio signal, and the distance d, and
identify a gesture based on the velocity of the swipe.

2. The wearable device of claim 1, wherein:
the instructions further cause the wearable device to generate an audio signature associated with features of the first audio signal and the second audio signal and identify the gesture based on the velocity and the audio signature.

3. The wearable device of claim 2, wherein:
the features are associated with characteristics of the first audio signal and the second audio signal,
the characteristics include at least one of energy, power, time start, time stop, spectrogram measurements, or band limited sampling, and
the features include at least one of power peaks, time between power peaks, power spans, or min power spans.

4. The wearable device of claim 2, wherein the generation of the audio signature is based on the first audio signal and the second audio signal and a texture of a portion of the wearable device that received the swipe.

5. The wearable device of claim 1, wherein identifying the gesture is based on an output of at least one of a regressor trained to predict coordinates associated with the wearable device based on user interactions or a classifier trained to predict a spatial gesture based on the user interactions.

6. The wearable device of claim 1, wherein the instructions, when executed by the processor, further cause the wearable device to provide a user interface for modifying parameters used to identify the gesture.

7. The wearable device of claim 1, wherein the first audio signal and the second audio signal are based on internal vibrations over a frame of the wearable device.

8. The wearable device of claim 7, wherein the frame includes a phase offset layer and the first microphone and the second microphone are embedded under a surface of the frame, wherein the velocity is determined based on coordinate information that is determined based on phase delays caused by the phase offset layer.

9. The wearable device of claim 1, wherein the instructions, when executed by the processor, further cause the wearable device to generate a feature matrix based on the first audio signal and the second audio signal using beamforming.

10. The wearable device of claim 1, wherein the instructions, when executed by the processor, further cause the wearable device to ensure that the first audio signal and the second audio signal are based on contact with the wearable device.

11. The wearable device of claim 1, wherein the wearable device is a frame-based augmented reality (AR) device.

12. The wearable device of claim 1, wherein the time delay between the first audio signal and the second audio signal includes a time delay between peaks of the first audio signal and the second audio signal.

13. The wearable device of claim 1, wherein a depth of the first microphone below a surface of the housing is different than a depth of the second microphone below the surface of the housing.

14. A method comprising:
processing two swipe audio signals generated based on a swipe on a wearable device that includes a first microphone and a second microphone to determine a time delay between the two swipe audio signals, the first microphone and the second microphone being by a distance d, a depth of the first microphone below a surface of a housing being different than a depth of the second microphone below the surface of the housing;
determining a velocity of the swipe based on the time delay between the two swipe audio signals and the distance d; and
identifying a gesture based on the velocity of the swipe.

15. The method of claim 14, wherein identifying the gesture includes:
measuring characteristics associated with the two swipe audio signals, and
generating features associated with the characteristics,
wherein identifying the gesture is further based on the features.

16. The method of claim 14, wherein identifying the gesture is based on output of at least one of a regressor trained to predict coordinates associated with the wearable device based on user interactions or a classifier trained to predict a spatial gesture based on the user interactions.

17. The method of claim 14, wherein the surface of the wearable device prevents contact between the first microphone and the second microphone and a finger performing the swipe.

18. A non-transitory computer-readable storage medium comprising instructions stored thereon that, when executed by at least one processor, are configured to cause a wearable device to:
process two swipe audio signals generated based on a swipe on the wearable device using a first microphone and a second microphone to determine a time delay between the two swipe audio signals, the first microphone and the second microphone being separated by a distance d, a depth of the first microphone below a surface of a housing being different than a depth of the second microphone below the surface of the housing;
determine a velocity of the swipe based on the time delay between the two swipe audio signals and the distance d; and
identify a gesture based on the velocity of the swipe.

19. The non-transitory computer-readable storage medium of claim 18, wherein the identification of the gesture includes:
measuring characteristics associated with the two swipe audio signals,
generating features associated with the characteristics, and identification of the gesture is further based on the features.

20. The non-transitory computer-readable storage medium of claim 18, wherein the identification of the gesture is based on a selection, by a user of the wearable device, of a region of the wearable device for a particular gesture.

* * * * *

UNITED STATES PATENT AND TRADEMARK OFFICE
CERTIFICATE OF CORRECTION

| | | |
|---|---|---|
| PATENT NO. | : 12,307,053 B2 | Page 1 of 1 |
| APPLICATION NO. | : 17/453697 | |
| DATED | : May 20, 2025 | |
| INVENTOR(S) | : Hu et al. | |

It is certified that error appears in the above-identified patent and that said Letters Patent is hereby corrected as shown below:

In the Claims

In Column 20, Claim 14, Line 21, delete "being" and insert -- being separated --, therefor.

Signed and Sealed this
First Day of July, 2025

Coke Morgan Stewart
*Acting Director of the United States Patent and Trademark Office*